US012206214B2

(12) United States Patent
De Cloet et al.

(10) Patent No.: US 12,206,214 B2
(45) Date of Patent: Jan. 21, 2025

(54) CRIMP CONTACT, CRIMP CONNECTION AND METHOD FOR MAKING A CRIMP CONNECTION

(71) Applicant: TE Connectivity Germany GmbH, Bensheim (DE)

(72) Inventors: Olivier De Cloet, Bensheim (DE); Uwe Bluemmel, Bensheim (DE); Daniel Volkmann, Bensheim (DE); Turgay Yilmaz, Bensheim (DE); Michael Delp, Bensheim (DE); Erik Glombitza, Bensheim (DE); Karl Zhung-Wei Choi, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 131 days.

(21) Appl. No.: 17/741,851

(22) Filed: May 11, 2022

(65) Prior Publication Data

US 2022/0368039 A1 Nov. 17, 2022

(30) Foreign Application Priority Data

May 12, 2021 (DE) ........................ 102021112505.7

(51) Int. Cl.
*H01R 4/20* (2006.01)

(52) U.S. Cl.
CPC .................................... *H01R 4/20* (2013.01)

(58) Field of Classification Search
CPC .......... H01R 4/20; H01R 4/203; H01R 4/187; H01R 4/188; H01R 4/186; H01R 4/185; H01R 4/184; H01R 4/18
USPC .......................................................... 439/877
See application file for complete search history.

(56) References Cited

U.S. PATENT DOCUMENTS

| | | | | |
|---|---|---|---|---|
| 6,808,417 B2 * | 10/2004 | Yoshida | ............ | H01R 13/6473 439/585 |
| 8,011,954 B2 | 9/2011 | Nagafuchi | | |
| 8,147,281 B2 | 4/2012 | Yasumichi et al. | | |
| 9,039,467 B2 * | 5/2015 | Seipel | .................... | H01R 4/185 439/877 |
| 9,502,785 B2 * | 11/2016 | Schmidt | ............... | H01R 43/048 |
| 9,673,578 B1 * | 6/2017 | Lane | .................... | H01R 13/631 |
| 10,699,823 B2 * | 6/2020 | Blackburn | ............... | H04B 3/30 |

(Continued)

FOREIGN PATENT DOCUMENTS

| | | |
|---|---|---|
| DE | 10315042 B4 | 5/2007 |
| EP | 3726667 A1 | 10/2020 |

(Continued)

OTHER PUBLICATIONS

Office Action from Japan's Patent Office dated Apr. 18, 2023 with English translation thereof, corresponding to Application No. 2022-076901, 8 pages.

(Continued)

*Primary Examiner* — Harshad C Patel
(74) *Attorney, Agent, or Firm* — Barley Snyder

(57) ABSTRACT

A crimp contact includes a crimp barrel having a crimp base, a pair of crimp shoulders, a crimp region, and an impedance matching region. The crimp shoulders in the crimp region form a longitudinal seam when bent around an electrical conductor. An outer surface of the crimp barrel in the impedance matching region has a gradual expansion along a direction of the longitudinal seam.

15 Claims, 11 Drawing Sheets

(56) References Cited

U.S. PATENT DOCUMENTS

| | | | | |
|---|---|---|---|---|
| 11,233,360 | B2 * | 1/2022 | Mandel | H01R 13/6608 |
| 2002/0022414 | A1 | 2/2002 | Kitagawa et al. | |
| 2012/0202372 | A1 * | 8/2012 | Hardy | H01R 13/5804 439/585 |
| 2017/0077642 | A1 * | 3/2017 | Benham | H01R 13/622 |
| 2018/0183190 | A1 * | 6/2018 | Volkmann | H01R 9/0518 |
| 2018/0294612 | A1 * | 10/2018 | Shimada | H01R 43/058 |
| 2019/0044252 | A1 * | 2/2019 | Washio | H01R 4/185 |
| 2019/0097330 | A1 * | 3/2019 | Bergner | H01R 4/20 |
| 2019/0165489 | A1 | 5/2019 | Sato et al. | |
| 2019/0165490 | A1 | 5/2019 | Sato et al. | |
| 2020/0328536 | A1 * | 10/2020 | Brandt | H01R 4/184 |
| 2022/0029371 | A1 * | 1/2022 | De Cloet | H01R 43/0488 |

FOREIGN PATENT DOCUMENTS

| | | | |
|---|---|---|---|
| JP | 200954483 | A | 3/2009 |
| JP | 2017079168 | A | 4/2017 |
| JP | 2019029265 | A | 2/2019 |
| JP | 2019096569 | A | 6/2019 |
| JP | 2020177909 | A | 10/2020 |
| JP | 2021064566 | A1 | 4/2021 |
| KR | 1020200121242 | A | 10/2020 |

OTHER PUBLICATIONS

Extended European Search Report dated Oct. 6, 2022, corresponding to Application No. 22172467.7-1201, 8 pages.
German Office Action, Application No. 102021112505.7, Dated: Feb. 14, 2022, 36 pages.
Korean Office Action dated Jan. 14, 2024 with English translation, corresponding to Application No. 10-2022-0057816, 14 pages.

* cited by examiner

CRIMP CONTACT, CRIMP CONNECTION AND METHOD FOR MAKING A CRIMP CONNECTION

CROSS-REFERENCE TO RELATED APPLICATIONS

This application claims the benefit of the filing date under 35 U.S.C. § 119(a)-(d) of German Patent Application No. 102021112505.7, filed on May 12, 2021.

FIELD OF THE INVENTION

The invention relates to a crimp contact for making a crimp connection between an inner conductor terminal of a connector and an electrical conductor, and to a crimp connection including such a crimp contact. Furthermore, the invention relates to a method for manufacturing a crimp connection.

BACKGROUND

Crimp connections are known in the prior art and serve to establish an electrical contact as well as to create a mechanically loadable connection between a crimp contact and at least one electrical conductor that may include one or more individual wires. The crimp contact usually includes a crimp barrel (sometimes referred to as a crimp blank), which usually consists of a metal plate that is pre-bent in a U-shape. The underside of the U-shape is referred to below as the crimp base. The upward-facing legs of the U-shape are generally known as crimp shoulders or crimp wings.

Crimp connections are used, for example, in electrical (plug-in) connectors, such as radio frequency (RF) connector systems for coaxial and differential data transmission. Electrical connectors are known for interconnecting a wide variety of electrical components and structures, such as printed circuit boards, coaxial cables, discrete circuit components, flexible circuits, or the like. In general, such connectors may establish signal and/or power supply lines between identical or similar components, such as between two boards, but also between dissimilar components, such as a cable and a printed circuit board. Such connectors are manufactured in a variety of shapes and sizes, depending on the appropriate application. Likewise, the shape, size and spacing between contacts of such a connector vary significantly. Along with the shape, size, and spacing of the individual contacts, their impedance, hereinafter sometimes referred to as characteristic impedance, also changes.

In order to transmit high-frequency signals, which typically have an operating bandwidth of several GHz, by RF connectors, such RF connectors typically have at least one inner conductor terminal as an electrically conductive contact element, the inner conductor terminal being arranged within an outer conductor terminal that serves as a shield. For electrically insulating the inner conductor terminal from the outer conductor terminal and for stabilizing the RF connector, a dielectric insulation element is usually provided between the outer conductor terminal and the at least one inner conductor terminal, wherein the dielectric insulation element may be formed, for example, from a plastic, but also by an air gap. In this context, the term "high frequency signal" refers to AC electrical signals with an oscillation frequency in the range of 20 kHz to 20 GHz, but may also include AC electrical signals with an oscillation frequency above 20 GHz.

Nowadays, it is of great interest to provide high data rate communication links over the transmission line, for example for applications in the automotive industry and information and communication technology. To this end, it is necessary to ensure homogeneous impedance across the entire transmission system, including the RF connector and RF cables, since impedance mismatch causes reflections of the RF signals, resulting in unwanted noise and loss of signal transmission performance. Accordingly, care must be taken to maintain constant impedance when connecting cables, especially in connection with high-speed data transmission on associated connectors. It is also necessary to ensure homogeneous impedance over the entire length of the RF connector.

Since the impedance of a connector over the entire length of the connector depends on the internal geometry of the outer conductor terminal and the external geometry of the at least one inner conductor terminal, the arrangement of the outer conductor terminal and the at least one inner conductor terminal, as well as the specific design of the dielectric insulation element, impedance deviations may occur, particularly in the area of a crimp connection of the connector. For example, deviations or tolerances that are unavoidable when crimping the crimp connection, or an air gap surrounding the crimp connection, may lead to such impedance deviations.

It is therefore known from the prior art, for example, to adapt a geometry of the connector in the area of the crimp connection. In DE 103 15 042 B4, for example, it is proposed to attach a convex wall to an inner bottom surface of an opening section of the outer conductor terminal. In this way, the inner diameter of the opening section is reduced in the direction of a pressure terminal section, so that the impedance of the connector is also adapted in the vicinity of the pressure terminal section.

Furthermore, US 2017/077 642 A1 discloses an additional dielectric component in a connector, which simultaneously surrounds one end of an inner contact of the connector and a cable to be connected, in order to match the impedance of the connector to the impedance of the cable.

The known solutions, however, have the disadvantage that the specific geometries of the outer conductor terminal or the addition of additional components complicate a process of connecting a connector to a cable, as well as the compensation of tolerances in such a connection process.

SUMMARY

A crimp contact includes a crimp barrel having a crimp base, a pair of crimp shoulders, a crimp region, and an impedance matching region. The crimp shoulders in the crimp region form a longitudinal seam when bent around an electrical conductor. An outer surface of the crimp barrel in the impedance matching region has a gradual expansion along a direction of the longitudinal seam.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
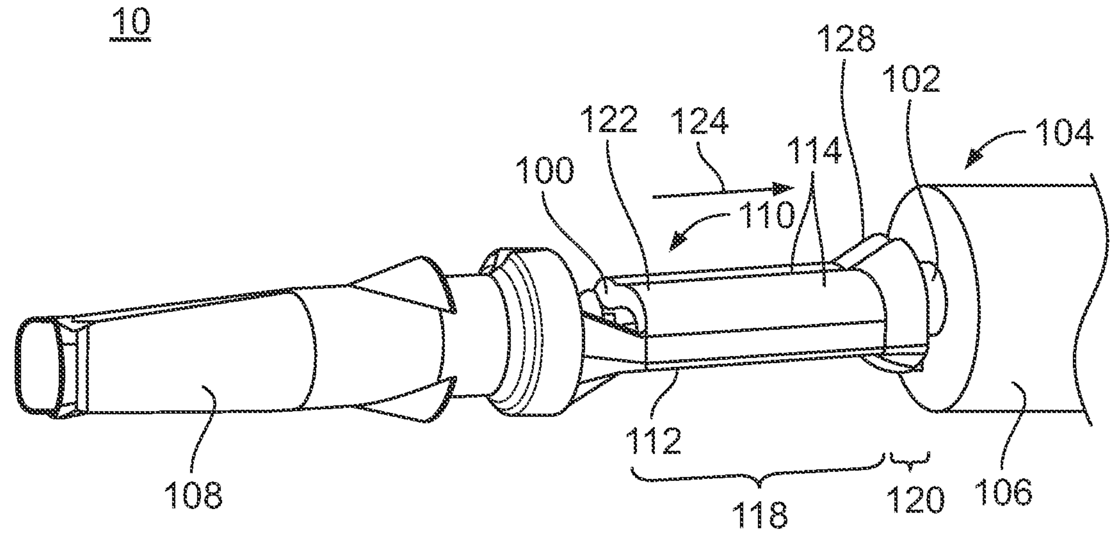
FIG. 1 is a perspective view of a crimp connection according to an embodiment.
Figure 2:
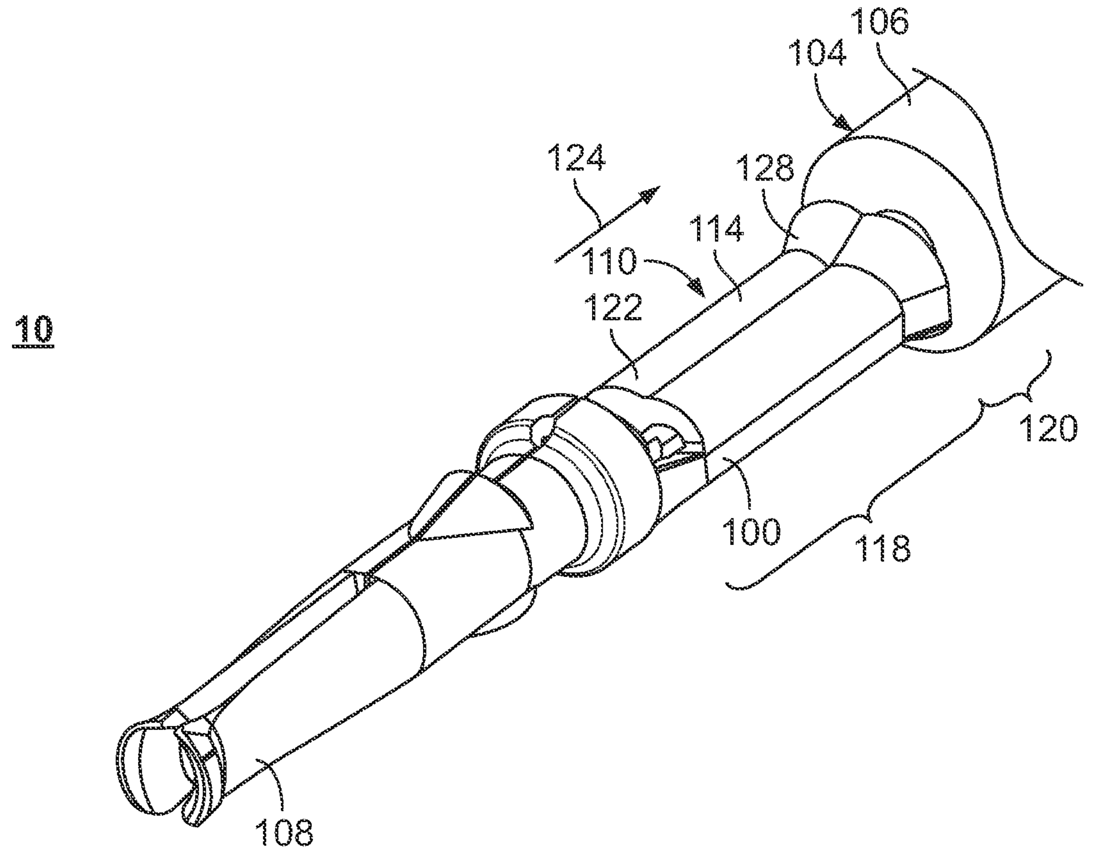
FIG. 2 is another perspective view of the crimp connection.
Figure 3:
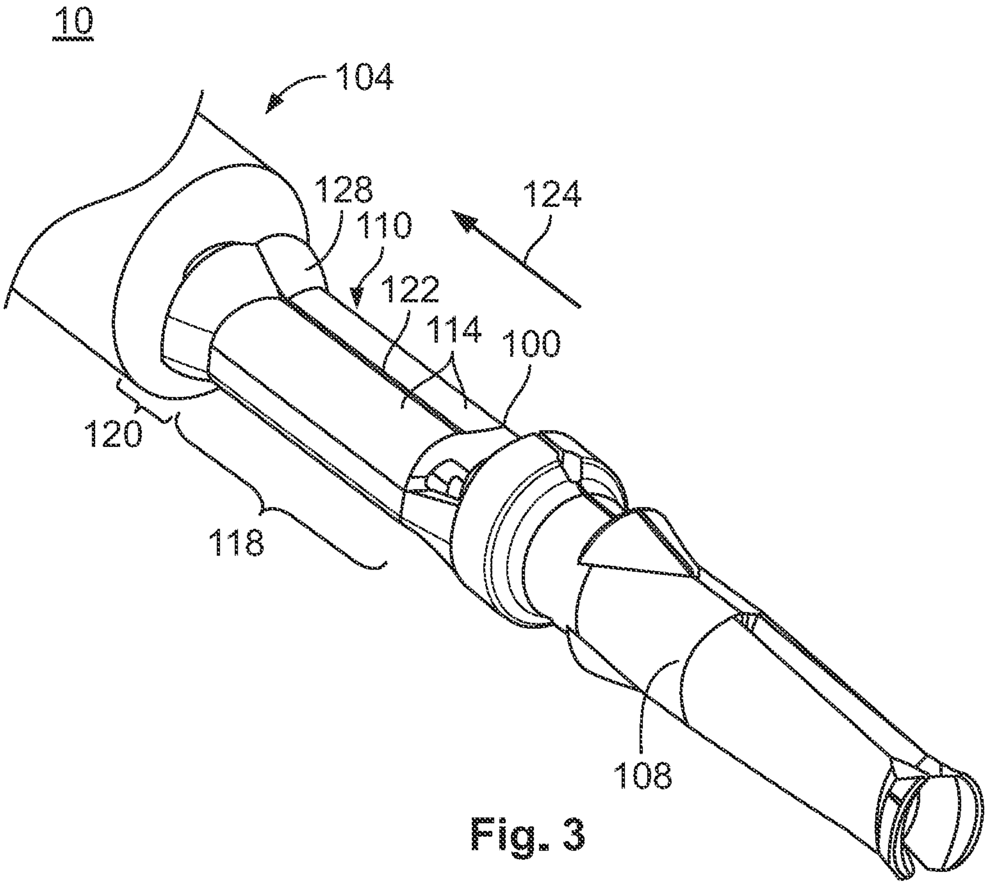
FIG. 3 is another perspective view of the crimp connection.
Figure 4:
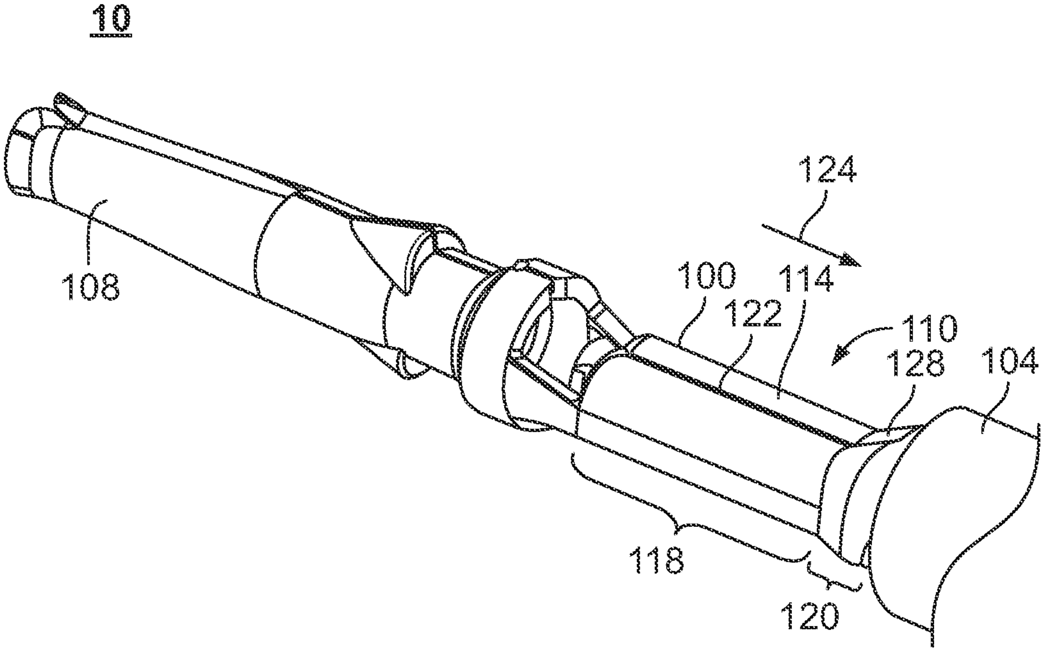
FIG. 4 is another perspective view of the crimp connection.

For a better understanding of the present invention, it will be explained in more detail with reference to the embodiments shown in the figures. Here, identical parts are provided with identical reference signs and identical component designations. Furthermore, some features or combinations of features from the different embodiments shown and described may also represent independent, inventive solutions or solutions in accordance with the invention.

In the following, the present invention is explained in more detail with reference to the figures, and first with reference to the schematic perspective views of FIGS. 1 to 5. It is noted that, in all the figures, the dimensional relationships and in particular the layer thickness relationships are not necessarily reproduced to scale. Furthermore, parts that are not necessary or obstructive for understanding are not shown, in particular electrically insulating housing elements and protective covers.

FIGS. 1 to 5 show various schematic perspective views of the crimp connection 10 according to the invention. The crimp connection 10 includes a crimp contact 100 and an electrical conductor 102. The electrical conductor 102 includes several individual wires, but at least one individual wire, and is part of an external electrical component, to which the crimp connection 10 makes electrical contact. In this example, the external electrical component is a cable 104, such as an RF cable, used to transmit high frequency signals via at least one inner conductor (also referred to as a signal conductor). In this case, the inner conductor serving as the electrical conductor 102 is stripped in the region of the crimp connection 10, that is, a cable-side electrical insulator 106 is removed before the crimp connection 10 is made in an end region of the electrical cable 104. Alternatively, the external electrical component may be a printed circuit board, for example.

In the example shown in FIGS. 1 to 5, the crimp contact 100 is attached to an electrically conductive contact element 108 to form an electrical connection between the electrically conductive contact element 108 and the electrical conductor 102 via the crimp connection 10. The electrically conductive contact element 108 may be an inner conductor terminal of a connector, for example formed as a socket element as shown in FIGS. 1 to 5. Of course, the electrically conductive contact element 108 may also be formed as a pin contact. In an embodiment, the electrically conductive contact element 108 and the crimp contact 100 are integrally formed and made of the same electrically conductive material, for example copper or a copper alloy. However, other conductive materials suitable for transmitting RF signals may also be used.

Figure 5:
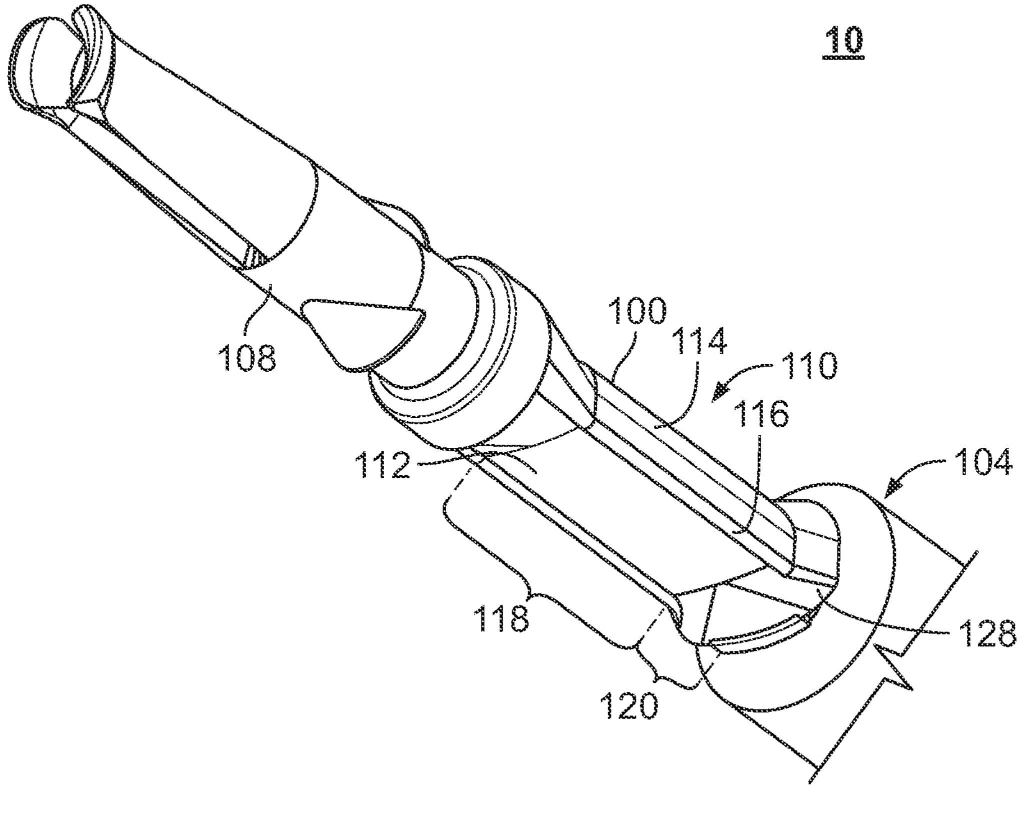
FIG. 5 is another perspective view of the crimp connection.

The crimp contact 100 includes a crimp barrel 110 having a crimp spine or back 112 and two crimp shoulders 114. The number of crimp shoulders 114 is not limited to two, but the crimp barrel 110 may include a plurality of crimp shoulders 114 depending on the application scenario. The so-called crimp roots 116 belonging to the zones with high bending stress are provided in a transition region from the crimp base 112 to the crimp shoulders 114, as shown in FIG. 5. Such zones of high bending stress are also still found at the top laterally of the crimp shoulders 114.

As shown in FIGS. 1 to 5, according to the invention, the crimp barrel 110 has a crimp region 118 and an impedance matching region 120. In the crimp region 118, the crimp shoulders 114 of the crimp barrel 110 are bent around the electrical conductor 102. The ends 126 (see FIGS. 8 to 10) of the crimp shoulders 114 engage with each other to form a longitudinal seam 122 extending along a longitudinal direction 124 of the crimp contact 100, thereby forming the crimp connection 10 with the electrical conductor 102. In this regard, the ends 126 of the crimp shoulders 114 may include various locking elements known in the prior art, which support the permanent cohesion of the longitudinal seam 122. In addition, the crimp shoulders 114 may also have sub-regions when interlocked, in which at least two of the crimp shoulders 114 overlie each other to increase a cross-section of the crimp barrel 110 in these sub-regions when crimped.

The crimp barrel 110 provides an impedance matching region 120 to compensate for an impedance mismatch that occurs in the transition from electrical cable 104 to the crimp contact 100, as shown in FIGS. 1 to 5. In this way, the most uniform impedance possible may be achieved along the entire length of the crimp contact 100. In the impedance matching region 120, the crimp barrel 110 has a gradual expansion 128 of the outer surface. In the example shown, the gradual expansion 128 shows a substantially linear increase in the outer circumference of the crimp barrel 110, with the outer circumference increasing in the longitudinal direction 124 towards the end of the crimp contact 100, i.e. in particular towards a conductor connection of the electrical cable 104. In this case, in the impedance matching region 120, the increase of the outer circumference of the crimp barrel 110 does not necessarily have to be linear, but may also have convex partial regions, which show an initially faster, then slower increase along the longitudinal direction 124, and/or concave partial regions, which show an initially slower, then faster increase along the longitudinal direction 124. The crimp barrel 110 may thus also have a convex or concave bulge in the impedance matching region 120 instead of the linear increase.

As further shown in FIGS. 1 to 5, the gradual expansion 128 completely surrounds the outer surface of the crimp barrel 110 in the impedance matching region 120. Thus, both the two crimp shoulders 114 and the crimp base 112 (see FIG. 5) have a gradual expansion 128 of the outer surface of the crimp barrel 110 in the impedance matching region 120. Thereby, the gradual expansion 128 is as uniform as possible along the circumference of the crimp barrel 110, so that an impedance matching as isotropic or radially symmetrical as possible may be formed in the impedance matching region 120. Consequently, the gradual expansion 128 has a geometric shape that is substantially similar to the shape of a funnel or trumpet, in which case the gradual expansion 128 may still include an indentation at the level of the longitudinal seam 122 that may be formed during crimping of the crimp connection 10.

However, it is possible that, in applications where impedance matching is required only in certain portions about the axis of the electrical conductor 102, the gradual expansion 128 may be provided only on at least one of the two crimp shoulders 114 or only on the crimp base 112.

In an embodiment, the ends 126 of the crimp shoulders 114 may also interlock in the impedance matching region 120 so that the longitudinal seam 122 is extended into the impedance matching region 120. This is not absolutely necessary, however, because the interlocking in the crimp region 118 already provides sufficiently large forces to hold together the crimp connection 10 in the crimped state. In an embodiment, the ends 126 of the crimp shoulders 114 may interlock only in the crimp region 118, so that the impedance matching region 120 need only be optimized with respect to impedance matching, but not with respect to crimping behavior.

Figure 6:
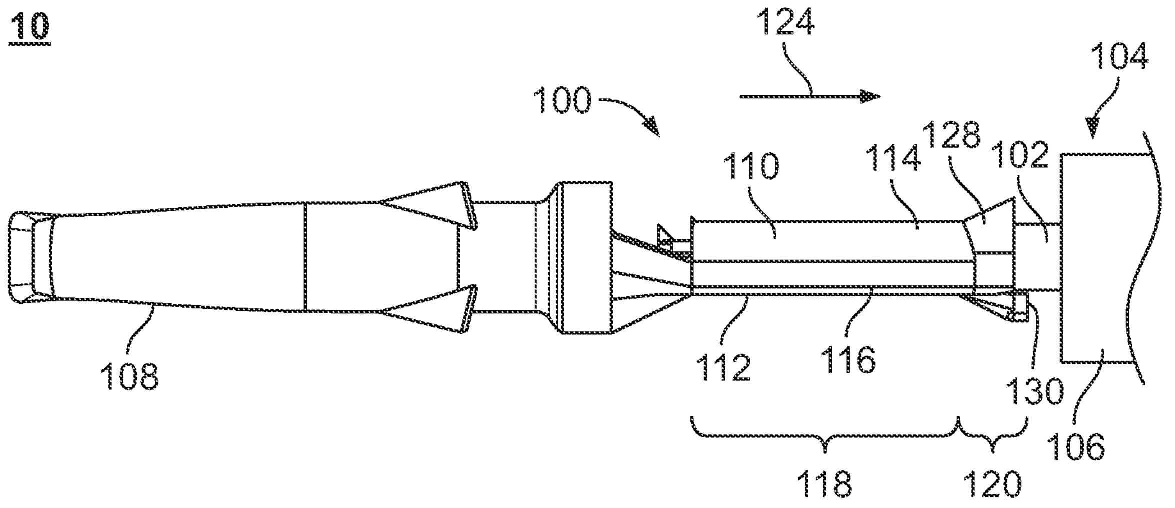
FIG. 6 is a side view of the crimp connection.

FIG. 6 shows a schematic side view of the crimp connection 10. As is clearly evident from the example shown, the gradual expansion 128 is arranged both on the side of the crimp base 112, i.e. on a lower side of the crimp barrel 110, and on the side of the longitudinal seam 122 formed by the crimp shoulders 114, i.e. on an upper side of the crimp barrel 110. The crimp barrel 110 may further include a protrusion 130 projecting along the longitudinal direction 124 toward the electrical cable 104, which may serve to further enhance compensation for an impedance mismatch. In the example shown, the protrusion 130 is disposed on the side of the crimp base 112, but it may also be disposed on the side of the crimp shoulders 114 or the longitudinal seam 122 formed by the crimp shoulders 114. Of course, a protrusion 130 may be arranged on different sides of the crimp barrel 110 in each case, or the protrusion 130 may completely surround the crimp barrel 110.

Figure 7:
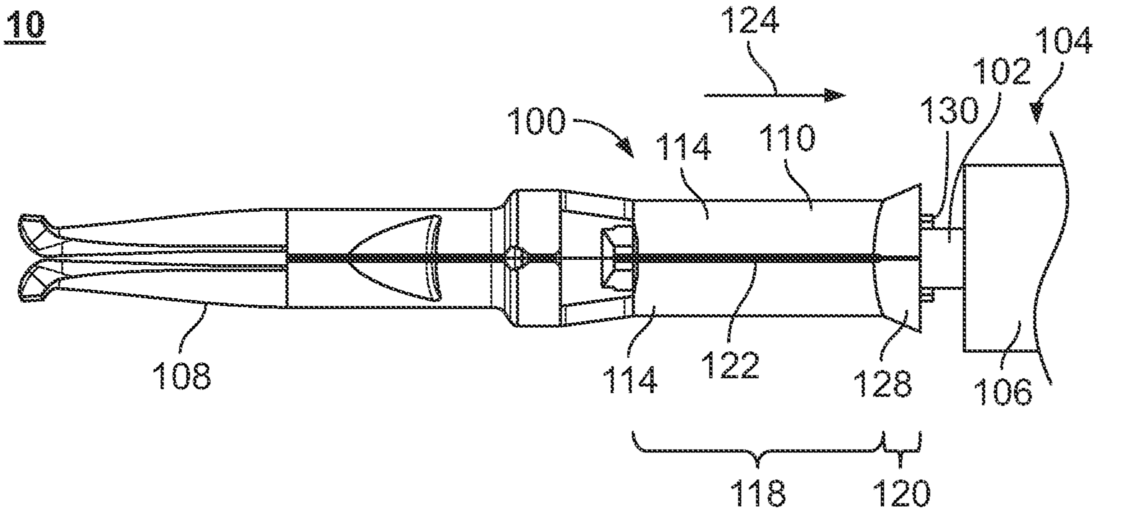
FIG. 7 is a top view of the crimp connection.

FIG. 7 shows a schematic top view of the crimp connection 10. As is evident from the example shown, the gradual expansion 128 is arranged respectively on the sides of the crimp shoulders 114, i.e. on the side surfaces of the crimp barrel 110. Further, it may be readily seen that the longitudinal seam 122 formed in the crimp region 118 may extend into the impedance matching region 120.

In the examples of FIGS. 6 and 7, the gradual expansion 128 again shows a linear increase in the circumference of the outer surface, such that the cross-section of the gradual expansion 128 is substantially funnel-shaped or cylindrical, i.e. substantially conical. In this regard, the selection of an opening angle of the funnel or cylinder, as well as the determination of a maximum outer diameter of the crimp barrel 110, may determine the strength of the impedance compensation provided by the gradual expansion 128. For example, a larger opening angle results in a greater increase in the gradual expansion 128, and thus may result in increased compensation for an impedance mismatch.

In each of the examples shown in FIGS. 1 through 7, the impedance matching region 120 is disposed in a rear region of the crimp barrel 110 that is arranged along the longitudinal direction 124 in the direction of the electrical cable 104. Such an arrangement allows compensation for an impedance mismatch directly in a transition region between the electrical cable 104 (or an alternative external electrical component) and the crimp contact 100. However, such an arrangement is not essential to the present invention. Depending on the requirements of the application scenario, the impedance matching region 120 may also be located in a forward region of the crimp barrel 110, i.e., along the longitudinal direction 124 in a region facing toward the electrically conductive contact element 108. Further, the impedance matching region 120 may also be located in a central region of the crimp barrel 110, i.e., it may divide the crimp region 118 into two sub-regions along the longitudinal direction 124, or it may be surrounded by at least two crimp regions 118 along the longitudinal direction 124. Also, the number of one impedance matching region 120 per crimp barrel is not essential to the present invention; rather, a crimp barrel may have multiple impedance matching regions 120 in different sub-regions.

Figure 8:
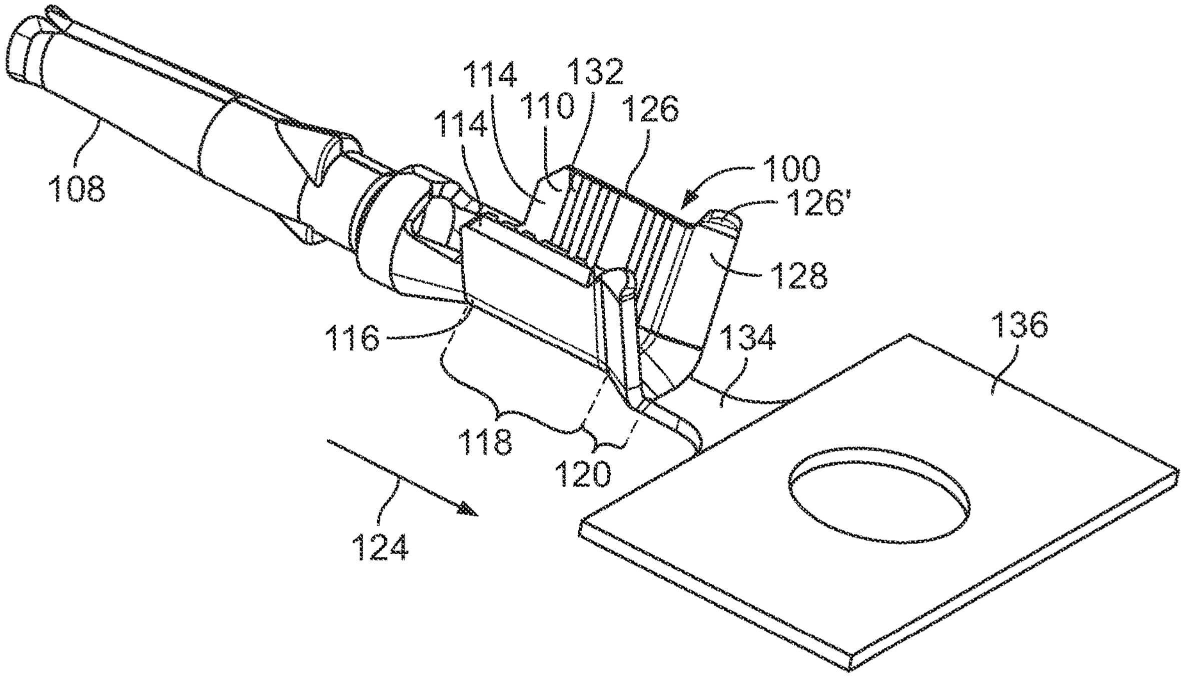
FIG. 8 is a perspective view of a crimp contact of the crimp connection in a non-crimped state.
Figure 9:
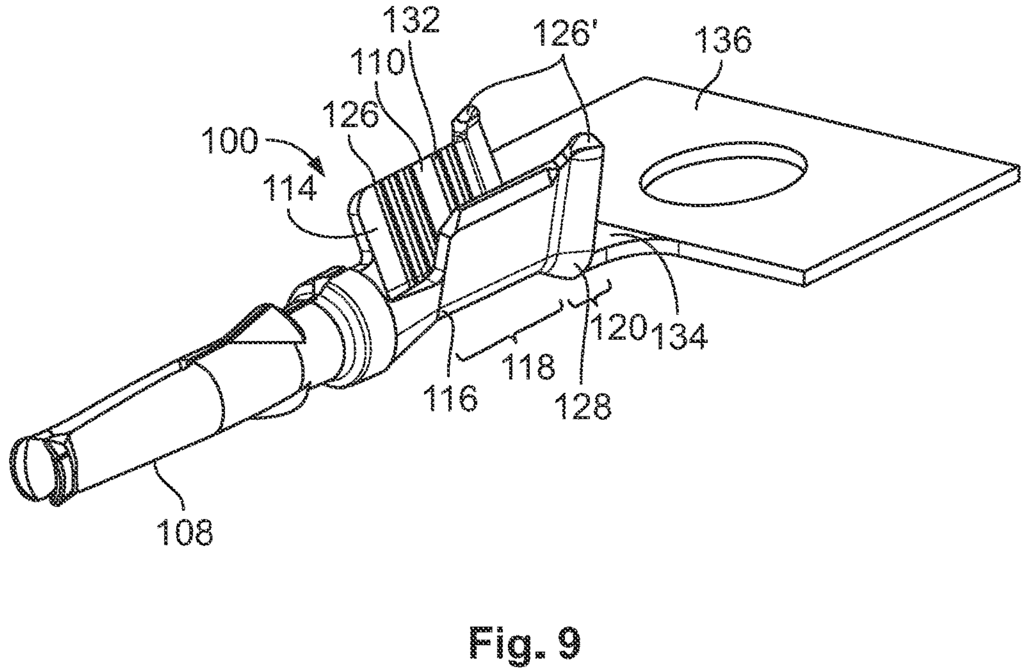
FIG. 9 is another perspective view of a crimp contact of the crimp connection in the non-crimped state.
Figure 10:
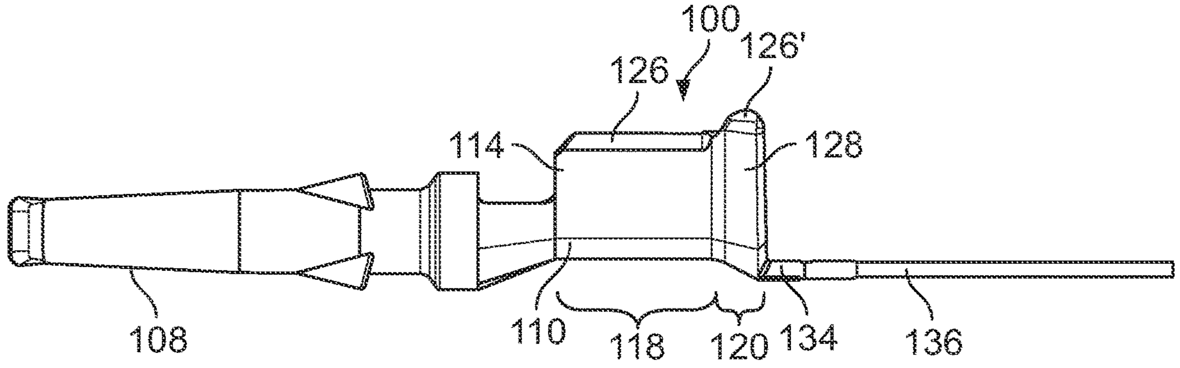
FIG. 10 is a side view of the crimp contact in the non-crimped state.
Figure 11:
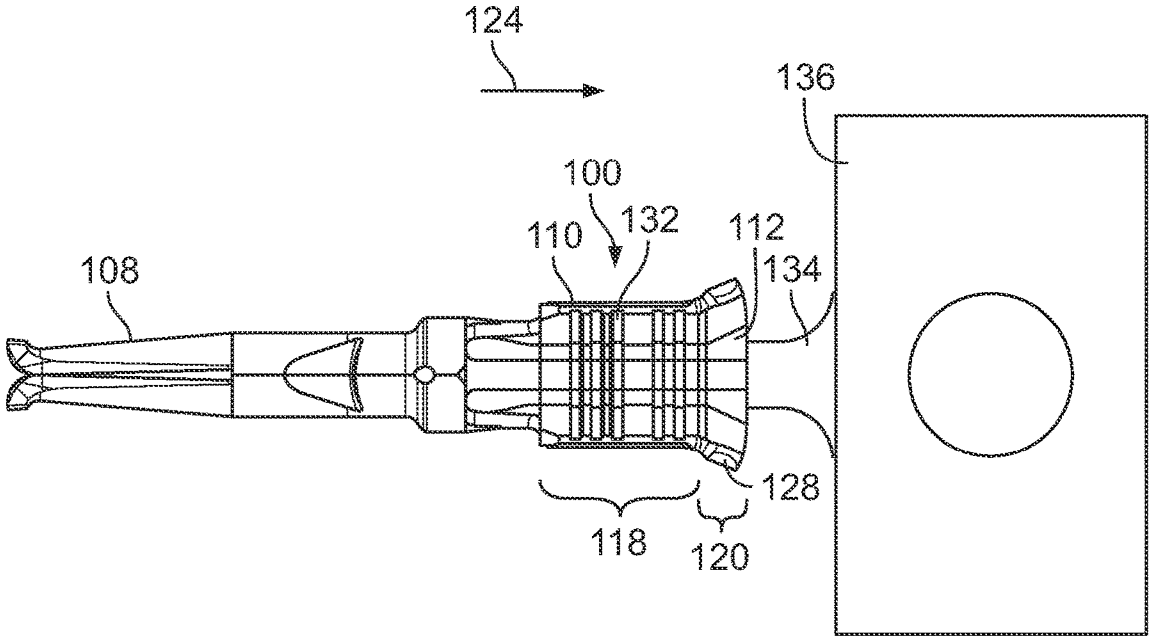
FIG. 11 is a top view of the crimp contact in the non-crimped state.

FIGS. 8 to 11 show the crimp contact 100 in a non-crimped state together with the electrically conductive contact element 108. In other words, the crimp barrel 110 is shown as a blank prior to the crimping process, as it may be stamped from a metal sheet. In this regard, FIGS. 8 and 9 each show schematic perspective views from different angles, FIG. 10 shows a schematic side view, and FIG. 11 shows a schematic top view.

The crimp barrel 110 may have sectional serrations 132 (also referred to as interdigitations) in various portions of the crimp region 118. The respective serrations 132 extend perpendicular to the longitudinal direction 124 and serve to break through oxide layers of the individual wires of the electrical conductor 102. Further, the crimp shoulders 114 may taper toward the ends 126 so as to facilitate formation of the longitudinal seam 122 when the crimp shoulders 114 are bent around the electrical conductor 102 to form the crimp connection 10.

FIGS. 8 to 11 show that the gradual expansion 128 of the outer surface of the crimp barrel 110 in the impedance matching region 120 is also formed with the crimp blank, that is, in the non-crimped state of the crimp barrel 110. In this regard, the expansion 128 may be achieved, for example, by bending the crimp barrel 110 outwardly, that is, in a radial direction away from a center axis of the crimp contact 100, in the impedance matching region 120. Alternatively, the expansion 128 may also be achieved by widening the cross-section of the crimp barrel 110 in the impedance matching region 120. Of course, however, simultaneous bending up and widening of the crimp barrel 110 in the impedance matching region 120 may also be achieved. Thus, the crimp barrel 110 may be stamped directly by simple modifications of a conventional manufacturing process.

Also in the impedance matching region 120, the crimp shoulders 114 may have ends 126' that interlock when the crimp connection 10 is formed as the crimp shoulders 114 are bent around the electrical conductor 102. In this regard, the crimp shoulders 114 may also be beveled or tapered toward the ends 126' in the impedance matching region 120 so that formation of the longitudinal seam 122 may also be facilitated in the impedance matching region 120. In order to enable the expansion 128 in the crimped state also in the region of the ends 126', the ends 126' of the crimp shoulders

114 in the impedance matching region 120 are offset slightly upwards compared to the ends 126 of the crimp shoulders 114 in the crimp region 118. For the same reason, the ends 126' may be bent inwardly, as illustrated in FIGS. 8 and 9.

FIG. 10 shows that a connecting bar 134 connecting the crimp barrel 110 to a carrier strip 136 is offset (in this example, in the direction of the crimp bump 112) on the crimp barrel 110 due to the gradual expansion 128 of the crimp barrel 110 in the impedance matching region 120 compared to a crimp barrel 110 without the gradual expansion.

Figure 12:
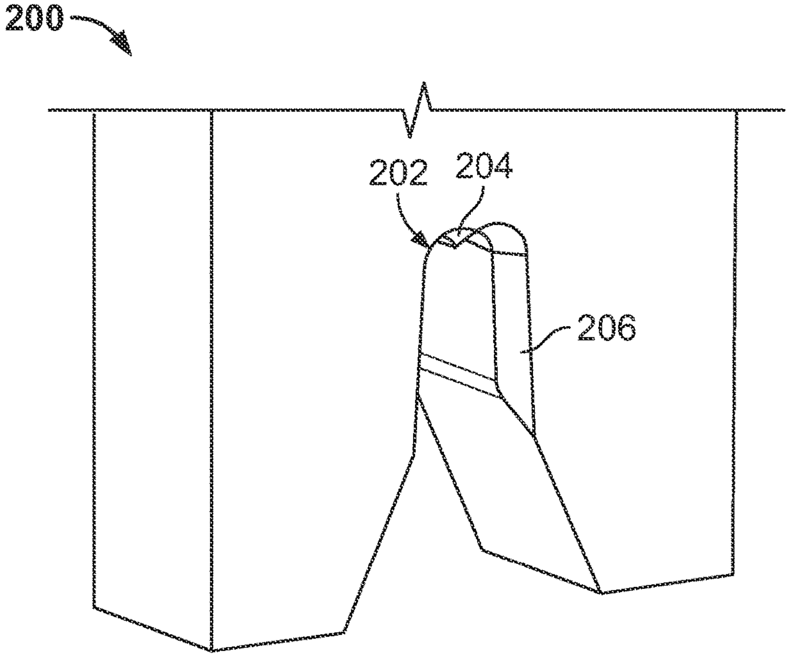
FIG. 12 is a schematic perspective view of a crimping die.

FIG. 12 shows a perspective view of a crimping die 200 according to the invention. An inner profile 202 of the crimping die 200 has the cross-sectional shape of a parabola and has a pointed wedge 204 that is located at the apex of the parabola and extends over the entire length of the crimping die 200. In the longitudinal direction, the crimping die 200 is divided into two sections, a front section and a rear section. The front section may be substantially analogous to known crimping dies, thereby ensuring that the crimping die 200 may provide reliable crimping of the crimp contact 100 in the crimp region 118.

The rear portion has a chamfer 206 relative to the front portion, as shown in FIG. 12, which extends along the parabola and allows the crimp contact 100 to form the gradual expansion 128 in the impedance matching region 120 after the crimp connection 10 is formed. In this regard, an inner profile of the chamfer 206 is complementary to an outer profile of the gradual expansion 128 in the crimped state in the region of the crimp shoulders 114 and the longitudinal seam 122. Consequently, a particular design of the rear region of the crimping die 200 may dictate a particular path of the gradual expansion 128 in the crimped state of the crimp contact 100.

Figure 13:
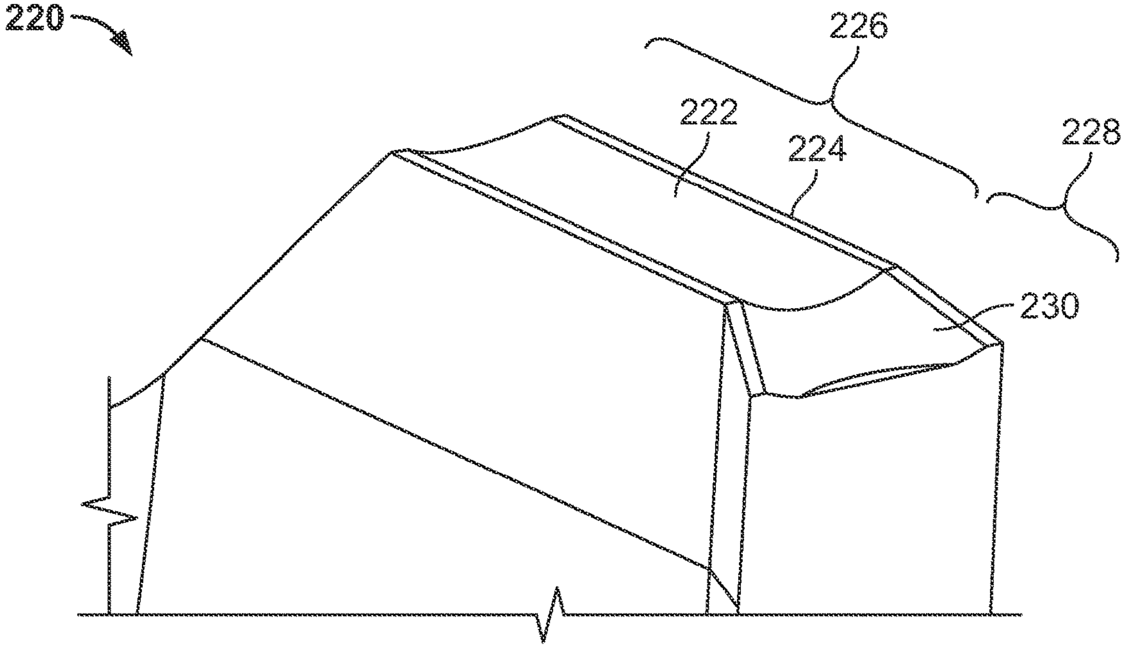
FIG. 13 is a schematic perspective view of an anvil.

FIG. 13 shows a perspective view of an anvil 220 configured according to the invention. The basic shape of its working surface results from a depression 222 with laterally attached flattened supporting surfaces 224. A front section 226 of the anvil 220 may be configured substantially analogously to known anvils, thus ensuring that the anvil 220 may provide reliable crimping of the crimp contact 100 in the crimp region 118.

Analogous to the rear portion of the crimping die, a rear portion 228 of the anvil 220 also includes a bevel 230 that may be formed in the depression 222 and along the support surfaces 224, as shown in FIG. 13. The bevel 230 allows the crimp contact 100 to form the gradual expansion 128 in the impedance matching region 120 after the crimp connection 10 is formed. In this regard, an inner profile of the bevel 230 is complementary to an outer profile of the gradual expansion 128 in the crimped state in the region of the crimp base 112. Consequently, a particular design of the rear region of the anvil 220 may dictate a particular path of the gradual expansion 128 in the crimped state of the crimp contact 100.

Figure 14:
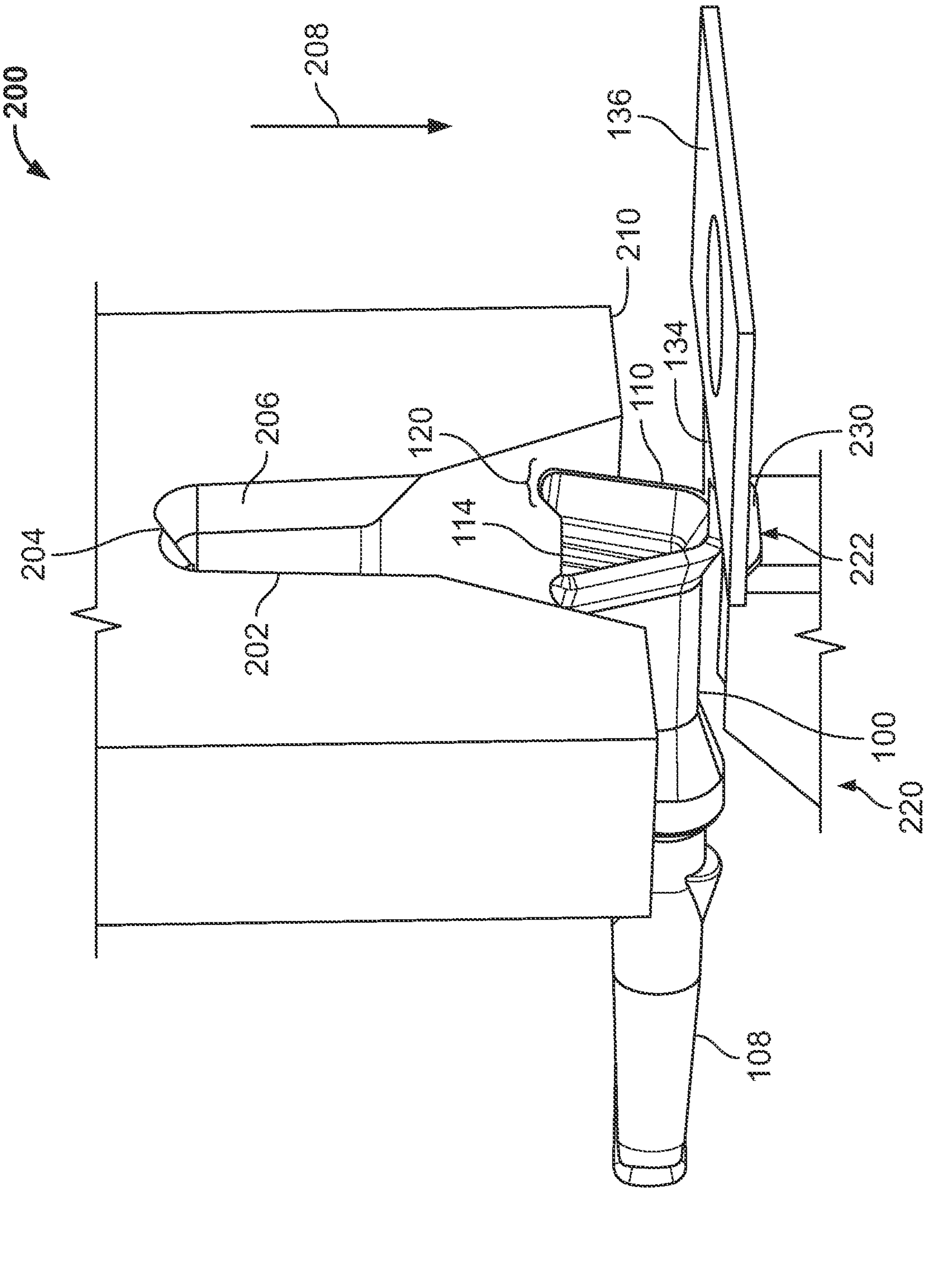
FIG. 14 is a schematic perspective view of a crimping process of the crimp contact with the crimping die and the anvil.
Figure 15:
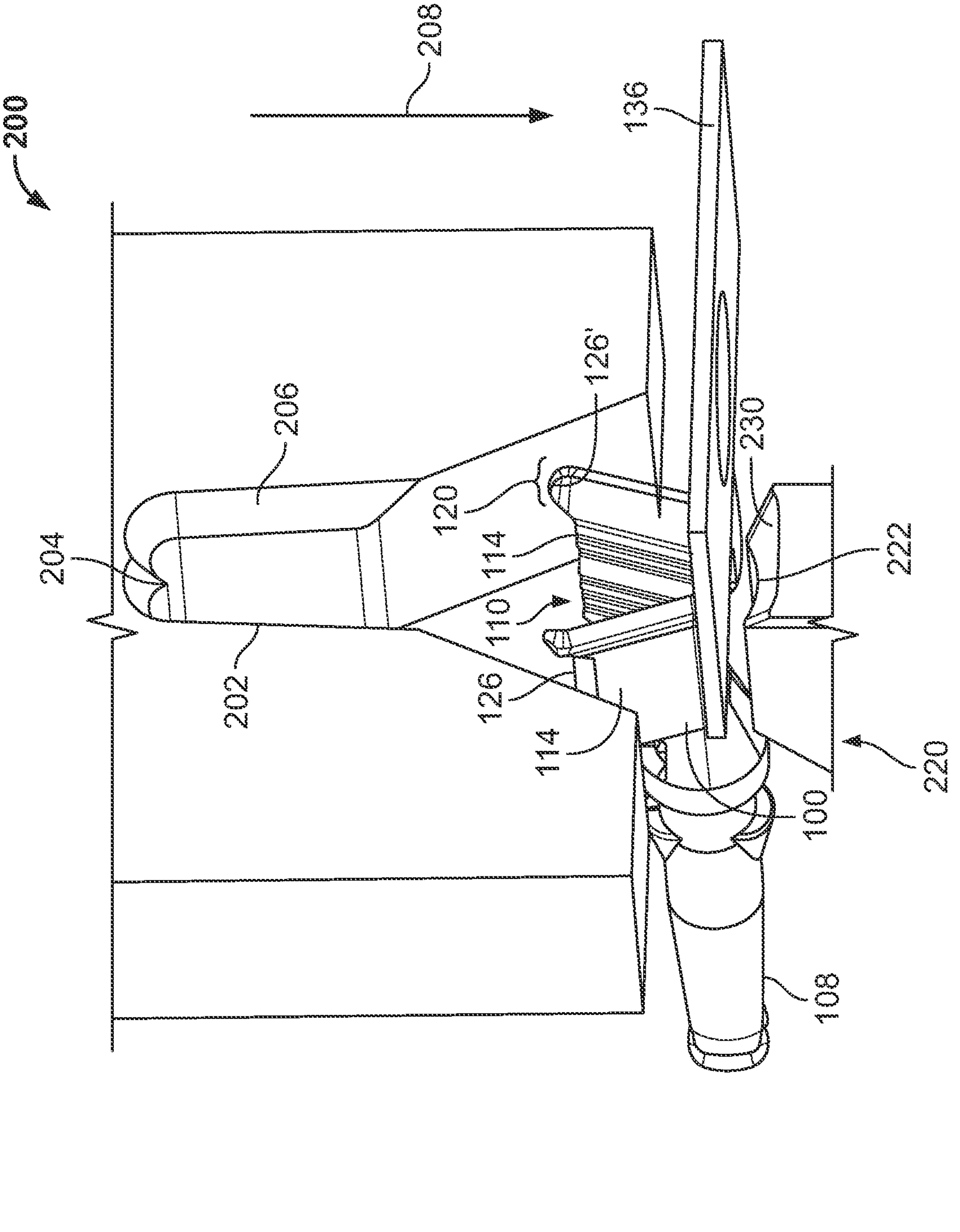
FIG. 15 is another schematic perspective view of the crimping process of the crimp contact with the crimping die and the anvil.

FIGS. 14 and 15 schematically illustrate a crimping process, in which the crimp connection 10 (see FIGS. 1 to 7) is made from the crimp contact 100 (see FIGS. 8 to 11) and the electrical conductor 102 using the crimping die 200 and the anvil 220.

First, the crimp barrel 110 with the crimp base 112 is placed in the center of the depression 222 of the anvil 220. The crimp shoulders 114 are thereby bent upwardly in a direction away from the anvil 220. Thereby, the impedance matching region 120 of the crimp barrel 110 is placed in the rear portion 228 of the anvil 220, which has the bevel 230. The electrical conductor 102 is placed between the upwardly bent crimp shoulders 114. The expansion of the outer surface of the crimp barrel 110 and/or a length of the impedance matching region 120 may be increased by a crimp die 200 when the crimp shoulders 114 are bent. As a result, the compensation of impedance may be achieved in a particularly simple and cost-effective manner.

The crimping die 200 is located above the anvil 220, and as it descends in the direction (illustrated by the arrow 208) of the anvil 220, its outer legs 210 enclose the anvil 220 and the crimp barrel 110 located thereon, including the crimp shoulders 114, with the impedance matching region 120 of the crimp barrel 110 being placed in the rear section of the crimping die 200, which has the bevel 206. When the crimping die 200 is lowered, the crimp shoulders 114 are guided by the inner profile 202 of the crimping die 202. The crimp shoulders 114 are thus bent around the electrical conductor 102 until the ends 126, 126' of the crimp shoulders 114 meet at the tip of the pointed wedge 204.

When the crimping die 200 is lowered, both the crimp barrel 110 with the electrical conductor 102 and the individual wires of the electrical conductor 102 are crimped together and pressed tightly together. The pressure exerted by the crimp die 200 is high enough so that the individual elements of the crimp connection 10 are in a dimensional flow state and are plastically deformed. As a result, the ends 126, 126' of the crimp shoulders 114 are able to engage with one another and be clamped together.

During the flowing process, the material of the crimp barrel 110 precisely adapts to the contour of the inner profile 202 of the crimping die 200 as well as to the working surface of the anvil 220. Thus, the material of the crimp barrel 110 penetrates into the depression 222 and the bevel 230 on the anvil 220, thereby matching the inner profile 202 of the crimping die 200 and, in particular, the bevel 206 of the crimping die 200. The outer contour of the crimp connection 10 thus represents a negative shape of the inner contour of the crimp die 200. In this way, the impedance compensation in the crimp connection 10 may be obtained in a particularly simple and cost-effective manner.

Therefore, the special shaping of the crimping die 200 may favor that the gradual expansion 128 of the crimp barrel 110 in the impedance matching region 120, which is already present in the non-crimped state of the crimp barrel 110 as shown in FIGS. 14 and 15, is further shaped by the crimping process. For example, the crimping die 200 may be configured to increase the expansion 128 of the outer surface of the crimp barrel 110 when the crimp shoulders 114 are bent by the crimping die 200. For example, a maximum outer circumference of the crimp barrel 110 when crimped may be greater than a maximum outer circumference of the crimp barrel 110 when non-crimped. Alternatively or additionally, a length or a pitch of the gradual expansion 128 may be greater in the crimped state than in the non-crimped state.

Figure 16:
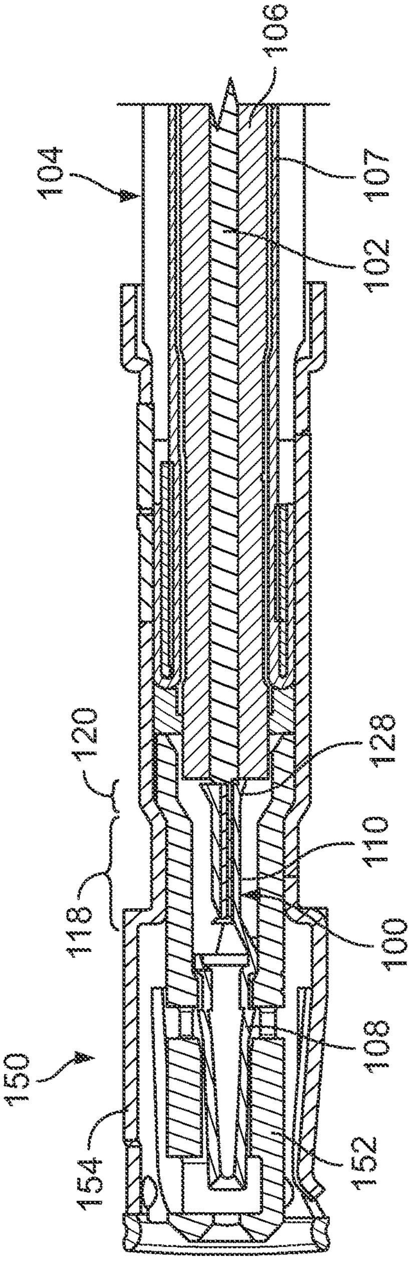
FIG. 16 is a sectional side view of an electrical connector having the crimp connection.

FIG. 16 shows an example of use of the described crimp contact 100 in a coaxial connector 150 that is connected to an electrical cable 104, in this case a coaxial cable, forming a crimp connection 10. The coaxial connector 150 includes an electrically conductive contact element 108, which serves as an inner conductor terminal, and which is electrically conductively connected to the electrical conductor 102 of the electrical cable 104 by the crimp connection 10. A dielectric insulation element 152 receives the electrically conductive contact element 108. The dielectric insulation element 152 is in turn received by an outer conductor terminal 154, such that the dielectric insulation element 152 is disposed between and spatially separates the electrically conductive contact element 108 and the outer conductor terminal 154. The outer conductor terminal 154 is in turn electrically connected to a shield 107 (or outer conductor) of the electrical cable. Such a connection may also be made by crimping, but also by soldering or welding, for example.

Consequently, the impedance of the coaxial connector 150 is substantially dictated by the internal geometry of the outer conductor terminal 154, the external geometry of the electrically conductive contact element 108 including the crimp contact 100, and the geometry and dielectric constant (also permittivity) of the dielectric insulation element 152. The gradual expansion 128 may be designed to keep the impedance substantially constant over the entire length of the electrically conductive contact element 108.

Figure 17:
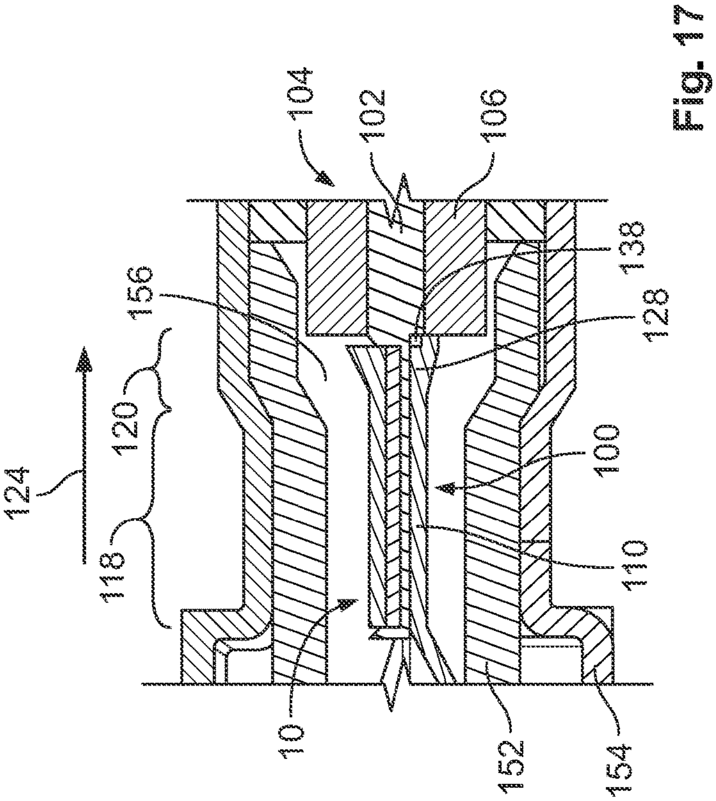
FIG. 17 is a detail sectional side view of the electrical connector having the crimp connection.

FIG. 17 shows an enlarged portion of FIG. 16 in the region of the crimp connection 10. As shown in FIG. 17, the dielectric insulation element 152 includes an air gap 156 disposed at a rear end of the dielectric insulation element 152, and thus in the region of the crimp contact 100. The air gap 156 serves as a feedthrough bevel for the internal contact assembly including the electrically conductive contact element 108 and the electrical cable 104, and is provided to facilitate the assembly process of the coaxial connector 150. Further, the air gap 156 may accommodate product and manufacturing tolerances, particularly of the dielectric insulation element 152 and the cable-side electrical insulator 106.

For this reason, it would be disadvantageous to change the geometry of the air gap 156 even if the air gap 156 results in impedance mismatch. Therefore, according to the invention, the crimp contact 100 is provided with a crimp region 118 and an impedance matching region 120, the impedance matching region 120 having the gradual expansion 128 that may compensate for the impedance mismatch induced by the air gap 156. In this regard, it is illustrated in particular in FIG. 17 that the impedance matching region 120 is advantageously arranged in the longitudinal direction 124 in the region of the air gap 156 so that an air content in the air gap 156 is reduced by the gradual expansion 128 of the outer circumference of the crimp barrel 110. In this case, an outer geometry of the crimp barrel 110 in the area of the crimp connection 10 may be adapted to the exact shape of the air gap 156, that is, to a geometry of the dielectric insulation element 152 as well as an inner geometry of the outer conductor terminal 154 depending on the application scenario.

In this regard, the crimp barrel 110 need not necessarily contact the electrical conductor 102 in the crimped state in the impedance matching region 120, but a recess 138 may be provided in the impedance matching region 120 between the crimp barrel 110 and the electrical conductor 102. Material savings may be achieved by the recess 138, while compensation for an impedance mismatch is achieved by the gradual expansion 128, still ensuring electrical contact between the crimp barrel 110 and the electrical conductor 102 in the crimp region 118.

Of course, application of the crimp contact 100 is not limited to coaxial connectors having an air gap 156, but crimp contacts 100 may be used in any type of connector to compensate for an impedance mismatch in the region of a crimp connection 10. In particular, crimp contacts 100 may also be used in connectors having a plurality of electrically conductive contact elements 108, such as, for example, twin axial, HDMI or USB connectors. In this case, the impedance matching regions 120 of individual crimp contacts 100 may also be adjusted to compensate for impedance mismatches between the plurality of electrically conductive contact elements 108 in the area of the crimp connection 10.

Figure 18:
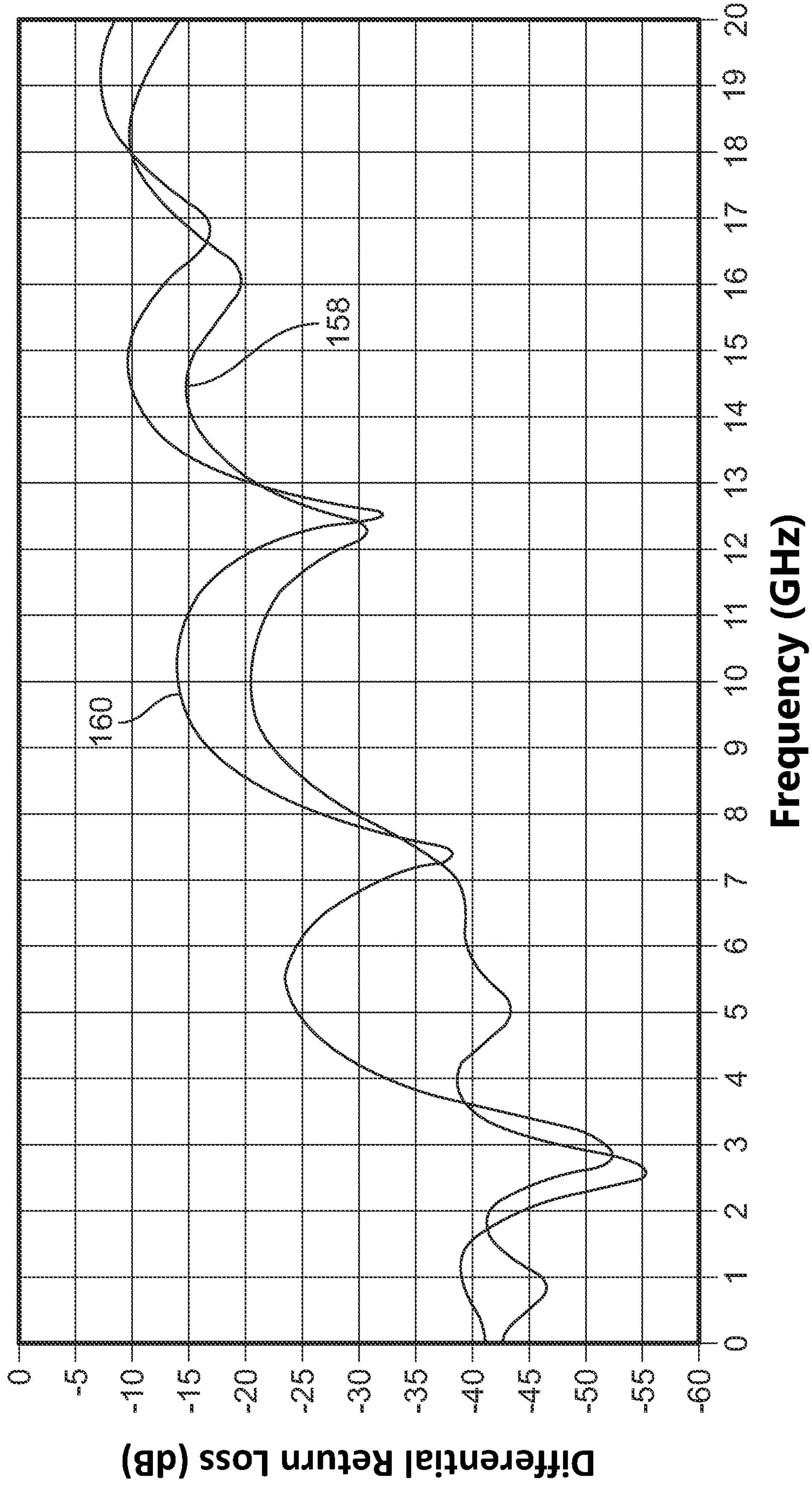
FIG. 18 is a graph of simulation results of differential return loss for various twin axial connectors.

FIG. 18 shows results of the differential return loss of a twin axial connector as a function of frequency in a diagram simulation. Here, curve 158 shows simulation results for a twin axial connector equipped with conventional crimp contacts, and curve 160 shows simulation results for a twin axial connector equipped with crimp contacts 100 according to the invention. As may be seen in the graph, use of the crimp contacts 100 according to the invention may improve the differential return loss of a twin axial connector over the entire simulated frequency range of 0 to 20 GHz.

The crimp contact 100 and the crimp connection 10 according to the embodiments described herein may be easily and inexpensively manufactured and may ensure an impedance matching in the case of an already determined geometry of a surrounding insulation element and/or a surrounding shielding.

The expansion 128 of the outer surface of the crimp barrel 110 in the impedance matching region 120 ensures that impedance deviations, which are caused by the contacting in the crimp region 118 and/or by a subsequent termination of a cable shield of the cable 104 to be connected, are compensated, while at the same time a reliable electrical contacting of the crimp contact 100 is enabled by the crimp region 118. For example, the influence of the air gap 156 located around the crimp contact 100 may also be compensated. In this case, the compensation of an impedance deviation is an intrinsic property of the crimp contact 100. Thus, the crimp contact 100 may be used in a connector in place of a known crimp contact without the need to provide additional components or adjustments to the manufacturing process. Thus, a simple and cost-neutral improvement of the RF performance may be achieved for a connector equipped with the crimp contact 100 according to the invention.

What is claimed is:

1. A crimp contact, comprising:

a crimp barrel having a crimp base, a pair of crimp shoulders, a crimp region, and an impedance matching region, the crimp shoulders in the crimp region form a longitudinal seam when bent around an electrical conductor, an outer surface of the crimp barrel in the impedance matching region has a gradual expansion along a direction of the longitudinal seam, the gradual expansion is an entirety of the outer surface of the crimp barrel in the impedance matching region, the crimp barrel has a protrusion extending from the gradual expansion in a longitudinal direction along the electrical conductor.

2. The crimp contact of claim 1, wherein the gradual expansion is formed as one of a convex bulge and a concave bulge on the outer surface of the crimp barrel.

3. The crimp contact of claim 1, wherein the impedance matching region is arranged in a rear region of the crimp contact located toward a conductor terminal.

4. The crimp contact of claim 1, wherein the gradual expansion in the impedance matching region is formed by bending up the crimp barrel.

5. The crimp contact of claim 1, wherein a cross-section of the crimp barrel in the impedance matching region is one of widened or reduced compared to a cross-section of a remainder of the crimp barrel.

6. The crimp contact of claim 1, wherein the crimp contact is integrally formed with an electrically conductive contact element of a connector.

7. The crimp contact of claim 1, wherein the protrusion has a free end in the longitudinal direction that is spaced apart from an electrical insulator disposed around the electrical conductor.

8. A crimp connection, comprising:

an electrical conductor; and a crimp contact including a crimp barrel having a crimp base, a pair of crimp shoulders, a crimp region, and an impedance matching region, the crimp shoulders in the crimp region form a longitudinal seam when bent around the electrical conductor, an outer surface of the crimp barrel in the impedance matching region has a gradual expansion along a direction of the longitudinal seam, the gradual expansion is an entirety of the outer surface of the crimp barrel in the impedance matching region, the crimp barrel has a protrusion extending from the gradual expansion in a longitudinal direction along the electrical conductor.

9. The crimp connection of claim 8, wherein the crimp barrel is formed in the impedance matching region substantially in a shape of a trumpet in a crimped state.

10. The crimp connection of claim 8, wherein, in the impedance matching region, a maximum outer circumference of the crimp barrel in a crimped state is greater than a maximum outer circumference of the crimp barrel in a non-crimped state.

11. The crimp connection of claim 8, further comprising a recess between the crimp barrel and the electrical conductor in the impedance matching region.

12. The crimp connection of claim 8, wherein a pair of ends of the pair of crimp shoulders interlock in the impedance matching region when the crimp shoulders are bent around the electrical conductor.

13. A method for making a crimp connection, comprising:

bending a pair of crimp shoulders of a crimp barrel around an electrical conductor to form a longitudinal seam in a crimped state, the crimp barrel in the crimped state has an impedance matching region in which a portion of an outer surface of the crimp barrel has a gradual expansion in a direction of the longitudinal seam, the gradual expansion is an entirety of the outer surface of the crimp barrel in the impedance matching region, the crimp barrel has a protrusion extending from the gradual expansion in a longitudinal direction along the electrical conductor.

14. The method of claim 13, wherein the gradual expansion and a length of the impedance matching region is increased by a crimping die during bending of the crimp shoulders.

15. The method of claim 13, wherein the impedance matching region is formed only by a crimping process bending the crimp shoulders to the crimped state.

* * * * *